United States Patent
Grant et al.

(10) Patent No.: US 10,971,147 B2
(45) Date of Patent: Apr. 6, 2021

(54) COGNITIVE INTERVENTION FOR VOICE RECOGNITION FAILURE

(71) Applicant: International Business Machines Corporation, Armonk, NY (US)

(72) Inventors: Robert H. Grant, Atlanta, GA (US);
Trudy L. Hewitt, Cary, NC (US);
Mitchell J. Mason, San Jose, CA (US);
Robert J. Moore, San Jose, CA (US);
Kenneth A. Winburn, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/295,463

(22) Filed: Mar. 7, 2019

(65) Prior Publication Data

US 2019/0206404 A1 Jul. 4, 2019

Related U.S. Application Data

(63) Continuation of application No. 15/421,872, filed on Feb. 1, 2017, now Pat. No. 10,229,682.

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G06F 40/174* (2020.01); *G10L 15/01* (2013.01)

(58) Field of Classification Search
CPC ................................ G06F 40/174; G06F 3/167
(Continued)

(56) References Cited

U.S. PATENT DOCUMENTS

| 5,033,088 A | 7/1991 | Shipman |
|---|---|---|
| 6,374,214 B1 | 4/2002 | Friedland et al. |

(Continued)

FOREIGN PATENT DOCUMENTS

| CN | 1649443 A | 8/2005 |
|---|---|---|
| EP | 2522114 A1 | 11/2012 |
| WO | WO2011084141 A1 | 7/2011 |

OTHER PUBLICATIONS

Knowles, "Redefining Roles: Language Learners, Teachers and Technology", IEEE Conference on Emerging e-learning Technologies and Applications, Oct. 24-25, 2013, pp. 215-220.
(Continued)

*Primary Examiner* — Jesse S Pullias
(74) *Attorney, Agent, or Firm* — Scully, Scott, Murphy & Presser, P.C.; Brian Restauro, Esq.

(57) ABSTRACT

In an aspect of the present disclosure, a method for providing an alternate modality of input for filling a form field in response to a failure of voice recognition is disclosed including prompting the user for information corresponding to a field of a form, generating speech data by capturing a spoken response of the user to the prompt using at least one input device, attempting to convert the speech data to text, determining that the attempted conversion has failed, evaluating the failure using at least one speech rule, selecting, based on the evaluation, an alternate input modality to be used for receiving the information corresponding to the field of the form, receiving the information corresponding to the field of the form from the alternate input modality, and injecting the received information into the field of the form.

19 Claims, 6 Drawing Sheets

(51) Int. Cl.
*G10L 15/01* (2013.01)
*G06F 3/16* (2006.01)
*G06F 40/174* (2020.01)

(58) Field of Classification Search
USPC .................................. 704/231–257, 270–275
See application file for complete search history.

(56) References Cited

U.S. PATENT DOCUMENTS

| | | |
|---|---|---|
| 6,418,410 B1 | 7/2002 | Nassiff et al. |
| 6,618,697 B1 | 9/2003 | Kantrowitz et al. |
| 6,754,643 B1 | 6/2004 | Goldsmith |
| 6,859,774 B2 | 2/2005 | Mangu et al. |
| 7,739,117 B2 | 6/2010 | Ativanichayaphong et al. |
| 7,953,597 B2 | 5/2011 | Ativanichayaphong et al. |
| 8,326,622 B2 | 12/2012 | Kraenzel et al. |
| 8,446,453 B2 | 5/2013 | Tian et al. |
| 8,718,242 B2 | 5/2014 | Bangalore et al. |
| 9,001,182 B2 | 4/2015 | Tian et al. |
| 10,229,682 B2 * | 3/2019 | Grant .................... G06F 40/174 |
| 2002/0002459 A1 | 1/2002 | Lewis et al. |
| 2002/0123893 A1 | 9/2002 | Woodward |
| 2002/0135618 A1 | 9/2002 | Maes et al. |
| 2004/0006480 A1 | 1/2004 | Ehlen et al. |
| 2004/0117804 A1 | 6/2004 | Scahill et al. |
| 2005/0027535 A1 | 2/2005 | Martin et al. |
| 2005/0102142 A1 | 5/2005 | Soufflet et al. |
| 2008/0133228 A1 | 6/2008 | Rao |
| 2011/0164107 A1 | 7/2011 | Tian et al. |
| 2012/0323574 A1 | 12/2012 | Wang et al. |
| 2013/0235866 A1 | 9/2013 | Tian et al. |
| 2013/0289995 A1 * | 10/2013 | Li .......................... G10L 15/04 704/254 |
| 2013/0339030 A1 | 12/2013 | Ehsani et al. |
| 2014/0316776 A1 | 10/2014 | Lee et al. |
| 2015/0149175 A1 | 5/2015 | Hirata et al. |

OTHER PUBLICATIONS

Knowles, "Recursive Hierarchical Recognition: A Brain-based Theory of Language Learning", FEELTA/NATE Conference Proceedings, Conference Paper, Jan. 2008, pp. 1-15.

Knowles, "On the Cusp: New Developments in Language Teaching", First published in ESL Magazine, 2004. www.eslmag.com (c) Modern English Publishing, pp. 1-11.

Knowles, "The Evolution of CALL", Journal of Communication & Education, www.languagemagazine.com, Aug. 2004, pp. 1-8.

Deng et al., "Challenges in Adopting Speech Recognition", Communications of the ACM, Jan. 2004, vol. 47, No. 1, pp. 69-75.

Oviatt, "Designing the User Interface for Multimodal Speech and Pen-Based Gesture Applications: State of the Art Systems and Future research Directions", Human-Computer Interaction, vol. 15, 2000—Issue 4, Published online: Dec. 9, 2009, pp. 263-322.

Suhm, "Multi Error Correction for Speech User Interfaces", ACM Transactions on Computer-Human Interaction, vol. 8, No. 1, Mar. 2001, pp. 60-98.

* cited by examiner

COGNITIVE INTERVENTION FOR VOICE RECOGNITION FAILURE

CROSS REFERENCE TO RELATED APPLICATION

This application is a continuation of copending U.S. patent application Ser. No. 15/421,872, filed Feb. 1, 2017, the entire contents and disclosure of which are hereby incorporated herein by reference.

BACKGROUND

Forms have traditionally been filled out by hand. In the past, a physical form would be filled out using a pen or pencil by an individual, for example, an employee of a business, a customer, or another party. Later, as forms became digitized, the fields of a form were separately designated by a computing device and a user of the computing device would fill in each field individually using an input device, e.g., a keyboard, mouse, touch screen, etc. More recently, voice recognition has been used to fill out the fields in a digital form. For example, a user's speech may be received by an input device such as a microphone and may be recorded, digitized, and analyzed by the computing device to generate text corresponding to the user's speech. The text may then be used to fill in the field of the form.

SUMMARY

The system, method, and computer program product described herein provide for the selection of alternative input modalities when speech recognition fails during form filling.

In an aspect of the present disclosure, a method for providing an alternate modality of input for filling a form field in response to a failure of voice recognition is disclosed. The method includes prompting the user for information corresponding to a field of a form, generating speech data by capturing a spoken response of the user to the prompt using at least one input device, attempting to convert the speech data to text, determining that the attempted conversion has failed, evaluating the failure using at least one speech rule, selecting, based on the evaluation, an alternate input modality to be used for receiving the information corresponding to the field of the form, receiving the information corresponding to the field of the form from the alternate input modality, and injecting the received information into the field of the form.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Voice recognition is an extremely useful technology that may be used for a variety of business activities. One such activity is filling in the fields of a large form. By enabling form filling by speech recognition, a business may speed up the form filling process. In some cases, however, it may be difficult or even impossible for existing technologies to recognize the words spoken by a user. When this occurs, the computing device analyzing the user's voice may prompt the user for a repeat of the word or sentence that was spoken. This may be frustrating for a user when the user is forced to constantly repeat him or herself. For example, the user may have an accent that the computing device does not recognize and may be forced to constantly repeat the response throughout the entire form filling process which may lead to user frustration. In other instances, the computing device may be unable to fill in an address because the spoken address does not match a known address in the system. In yet other instances, the user may have a speech impediment and the computing device may be unable to properly recognize the user's words due to the impediment. In yet another instance, the user may have a cognitive impairment or reduced cognitive awareness that affects the user's speech which may not be recognizable by the computing device.

In some instances, it may even be impossible for any known voice recognition technology to recognize the user's speech in a meaningful way that may be used to fill out a form field. For example, no matter how many times the user is forced to repeat the voice entry for a particular form field, the voice recognition technology may simply be unable to convert the voice into any meaningful text. In an aspect, a voice recognition engine that is capable of recognizing failure events, determining the field of the failure, cognitively invoking a manual intervention process and altering any pre-existing rules may be implemented.

Figure 1:
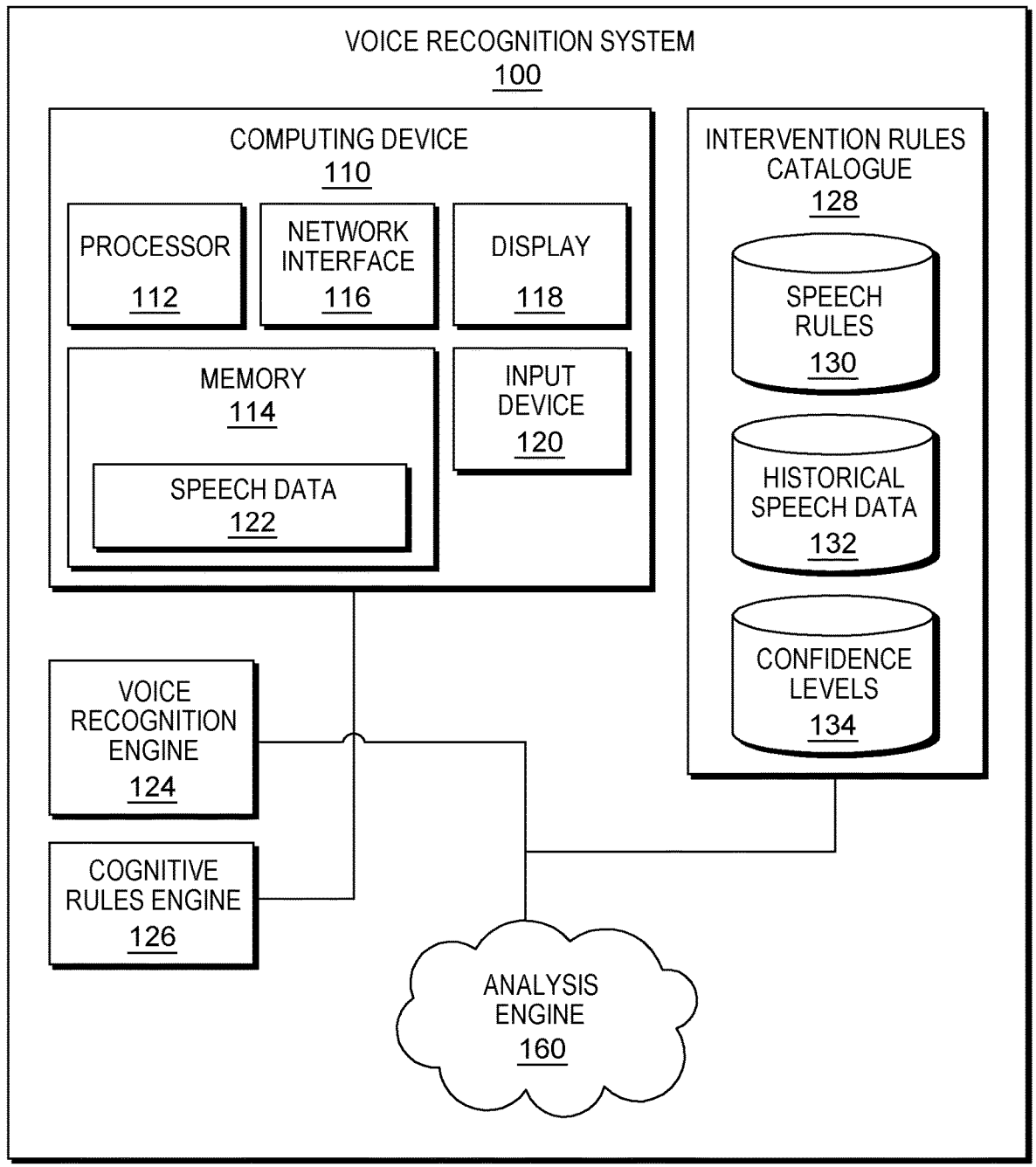
FIG. 1 is a system diagram in accordance with an aspect of the present disclosure.

With reference now to FIG. 1, a voice recognition system 100 is disclosed. System 100 is configured to gather speech data from a user, to convert the speech data to text for use in filling out fields in a form, and to perform a manual intervention when the conversion fails.

In some aspects, system 100 includes a computing device 110 and an analysis engine 160.

Computing device 110 includes a processor 112, memory 114, network interface 116, display 118, input device 120, and any other features common to a computing device. In some aspects, computing device 140 may, for example, be any computing device that is configured to receive speech data 122 from an input device 120. In some aspects, computing device 110 may include, for example, personal computers, laptops, tablets, smart devices, smart phones, smart wearable devices, smart watches, or any other similar computing device.

Processor 112 may include, for example, a microcontroller, Field Programmable Gate Array (FPGA), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Memory 114 may be configured to store speech data 122 received by input device 120.

Network interface 116 is configured to transmit and receive speech data or information to and from computing device 110 via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, or any other form of communication that allows computing device 110 to transmit or receive information.

Display 118 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 118 may include a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display, a keypad, a microphone, or other similar input devices or any other input devices that may be used alone or together to provide a user with the capability to interact with computing device 110. In some aspects, for example, input device 120 may be configured to receive or sense a user's speech and generate speech data 122 from the sensed user's speech.

In some aspects, computing device 110 may transmit speech data 122 to the cloud for remote analysis by an analysis engine 160. For example, the analysis engine 160 may be configured to analyze the received speech data 122 and perform voice recognition on the received speech data 122.

In some aspects, analysis engine 160 is configured to analyze both structured and unstructured data by applying advanced natural language processing, information retrieval, knowledge representation, automatic cognitive reasoning, and machine learning technologies. In some aspects, analysis engine 160 may be trained using a corpus of training data that is specific to a particular task. For example, analysis engine 160 may include a neural network or other similar machine learning system. In some aspects, analysis engine 160 may be trained to analyze the user's speech data 122 according to a particular criterion using a corpus of training data specific to that criterion. For example, the corpus of training material may provide analysis engine 160 with examples of speech data and text corresponding to the example speech data according to the criterion. An example analysis engine 160 that may be used to analyze a user's speech data 122 is IBM Watson®. In some aspects, existing analysis tools used by IBM Watson® may be leveraged including, for example, Speech to Text and Tone Analyzer tools. In some aspects, IBM Watson® may be trained with additional analysis tools by providing a training corpus of data for a specific criterion to be used in analysis of the user's speech data 122. In some aspects, analysis engine 160 may have access to one or more databases of speech data and speech criteria that may be utilized for analyzing the user's speech data 122.

In some aspects computing device 110 or analysis engine 160 may implement a voice recognition engine 124 that is configured to convert speech data 122 received by input device 120 into text. For example, voice recognition engine 124 may utilize voice recognition technologies to convert the user's speech into text. In some aspects, voice recognition engine 124 may be software stored in memory 114 that is executable by processor 112 to perform voice recognition on the speech data 122 generated by input device 120 from the user's speech. In some aspects, voice recognition engine 124 may be implemented by analysis engine 160 which may be trained to convert speech to text. In some aspects, voice recognition engine 124 may be configured to determine whether the conversion of speech to text has failed. For example, voice recognition engine 124 may analyze the speech data 122 to determine whether the speech data 122 may be converted into usable text to fill in a form field. For example, when voice recognition engine 124 is unable to convert all or a portion of the speech data 122 to meaningful text, voice recognition engine 124 may indicate to one or both of computing device 110 and analysis engine 160 that there is a failure in the conversion of speech to text.

In some aspects, computing device 110 or analysis engine 160 may implement a cognitive rules engine 126 that is configured to analyze the indicated failure in the conversion of speech data 122 to text by voice recognition engine 124 to determine a reason for the failure. For example, cognitive rules engine 126 may apply intervention rules found in an intervention rules catalogue 140 to the speech data 122 to determine the reasons for the failure and possible interventions that may be performed in response to the failure. In some aspects, cognitive rules engine 126 may be software stored in memory 114 that is executable by processor 112 to perform an analysis of the failed voice recognition. In some aspects, cognitive rules engine 126 may be implemented by analysis engine 160 which may be trained to analyze failures in speech to text conversion.

In some aspects, for example, cognitive rules engine 126 may initiate a repair action in response to a failure in the conversion of speech data 122. For example, the repair action may be a repeat request, a partial repeat request, a hearing check, or other similar repair actions. A repeat request may be a request to repeat the entire input for a particular field, for example, repeating the initial question and waiting for the user to speak the answer again. A partial repeat request may be a request for a part of the input for the field. For example, where the form field is for a series of numbers corresponding to a shipping identification number for an order, a repeat request would request that the user speak the entire shipping identification number while a partial repeat request may request that the user speak a subset of the number, e.g., the first four digits, the last four digits, or any other subset of the number. A hearing check may determine whether the user is in an environment that is inhibiting the voice recognition of the user's spoken input. For example, if the user is in a room that has a high level of ambient noise, e.g., music playing, loud machinery, talking, or other similar noises, this high level of ambient noise may be affecting the ability of voice recognition engine 124 to convert the users spoken input into meaningful text for filling in the form.

In some aspects, if the repair actions do not remedy the failure, cognitive rules engine 126 may further analyze and evaluate the speech data and the failure using an intervention rules catalogue 128. In some aspects, intervention rules catalogue 128 may include databases of speech rules 130, historical speech data 132, and associated confidence levels 134 that may be referenced against the current speech data 122 by cognitive rules engine 126 to determine the reason for the failure and the method of intervention that is most likely to succeed in receiving the necessary information for filling in the form field.

Speech rules 130 may include rules that may be used by cognitive rules engine 126 to analyze the speech data 122 and the failure to convert the speech data to text. As an example, speech rules 130 may include a rule that when the voice recognition engine 124 is unable to convert the entire spoken input captured in the speech data 122 into text for the filling in the form field, a manual intervention for that form field is required. As another example, speech rules 130 may include a rule that when voice recognition engine 124 is able to partially convert the spoken input capture in the speech data 122 into text, e.g., voice recognition engine 124 is able to generate text for a portion of the spoken input but not all of the spoken input, a manual intervention for only the missing portion of the spoken input may be required. For example, if the user's accent makes a particular word intelligible to the voice recognition engine 124 and therefore causes a failure, the manual intervention may prompt the user for only that word. For example, the manual intervention may prompt the user to input the failed word via keyboard, smart phone, text, or any other modality other than voice recognition. In some aspects, for example, the prompt may include identification of the surrounding words that were capture to the user. For example, where the spoken input is an address of "10 long avenue" but voice recognition engine 124 is unable to convert the word round into text, the prompt may, for example, be "in the phrase 10___ avenue, please input the word between 10 and avenue" or a similar prompt. In some aspects, rules can be used to decide which action to take after failure. For example, the rules may be used to prioritize the various alternate modals available. For example, if two alternate channels, e.g., SMS text messaging and data messaging, are available but one of the channels, e.g., data messaging, has a higher confidence of success, a rule may be in place to force the data messaging channel to be selected. In some aspects, for example, the rule may be based on data charges from the service provider for each modality where, for example, the rule may be used to select the channel having lower data charges. In some aspects the rules may be pre-defined, for example, by a system administrator, but also could be customized by a user of the system.

In some aspects, for example, the manual intervention may not prompt the user for additional information at all. For example, where a part of the speech has been converted successfully to text, secondary sources may be referenced to determine the missing word. For example, where the address is "10 long avenue" in a particular city and state, cognitive rules engine 126 may reference a map database to determine whether the missing word "long" may be found in the database with a high confidence. In some aspects, for example, previous forms that have been filled out by the user, company, etc., may be referenced to see if the partial conversion matches text that is found in the same field on previous forms. In this case, the remaining text from the previous form may be used to fill in the missing word or words. These techniques allow the voice recognition system 100 to assist the user in the speech to text conversion for filling in the form fields without requiring the user to provide a further input, thereby reducing user frustration and speeding up the voice recognition and form fill process.

Speech rules 130 may also include rules that are learned based on the user's interactions with voice recognition system 100. For example, as the user fills out forms, parts of the form where the user typically has failures in voice recognition may be tracked and logged. In some aspects, for example, the user's speech data 122 may be stored as historical speech data 132 for later use. The historical speech data 122 may also include any identifiers relevant to the context of how the speech data 122 was gathered, whether the voice recognition engine 124 failed to convert some or all of the speech data 122 to text, and any interventions performed by cognitive rules engine 126 in response to the failure. For example, if voice recognition engine 124 failed to convert some or all of the speech data 122, the failure may be logged with the speech data including the intervention used to resolve the failure, e.g., repeat requests, partial repeat request, any manual interventions that were used to obtain text corresponding to the failed speech data 122, or other similar contexts. In some aspects, the speech data 122 may be compared to the historical speech data 132 to determine the appropriate intervention to be performed by cognitive rules engine 126. In some aspects, after an intervention has occurred, a new speech rule 130 may be generated for the intervention and may be stored in historical speech data 132 for later use in future analysis of new speech data 122. In some aspects, an existing speech rule 130 may be updated based on the intervention. For example, if a user has historically had failures with the second half of a 16 digit code, e.g., a shipping tracking number, the system may use an alternative modality for submission of the last 8 digits. As the user continues to submit additional tracking numbers, the system may, for example, determine based on the historical failure rate of the last 8 digits by the user that the voice input of the user is likely to fail for the last eight of future shipping tracking numbers. Based on the determination, the system may prompt the user for voice submission of the first 8 digits while requesting that the user manual submit the second 8 digits, e.g., via sms texting. In some aspects, a form field, e.g., the shipping tracking number, may be broken into separate components by the system where, for example, the first component may be for the submission of the first 8 digits, e.g., via voice input, and the second component may be for the submission of the second 8 digits, e.g., via manual submission. For example, the system may determine the logical place to segment the form field, based on historical activity and success/failure rates of the various portions of the form field for the user.

Intervention rules catalog 128 may also store confidence levels 134 associated with speech rules 130 and historical speech data 132. For example, confidence levels 134 may be used to determine the likelihood of success of an intervention based on a given speech rule 130 with respect to a the speech data 122 based on the historical success of the speech rule 130 with similar speech data found in historical speech data 132. For example, an intervention that has been successful 75% of the time may have a confidence level 134 of $75/100$. In addition or alternatively to the use of a fraction, other similar ways of measuring confidence may also be used. In a system where multi-modal interventions are available, e.g., keyboard, text message, or other similar modalities, cognitive rules engine 126 may choose a modality for intervention having the best confidence level based on the applied speech rule 130. In some aspects, the system may analyze future form fields relative to the current form field in which a failure has been determined. For example, if the user has experienced failure with a particular form field 50% of the time, is currently having trouble with the form field, and there are another 3 form fields of the same or a similar type, e.g., numeric fields, address fields, etc., in yet to be completed areas of the form, the system may establish a high level of confidence that the user will have problems with these future areas of the form. Based on this confidence, the system may mark or otherwise indicate that the remaining form fields of the similar type for completion using an alternative modality.

Cognitive rules engine 126 evaluates the speech data 122 based on the speech rules 130, historical speech data 132, and confidence levels 134 to determine the best option for intervention. For example, cognitive rules engine 126 may determine the intervention to be used based on an evaluation of the user's cognition (for example, as evaluated from previous speech), signal strength of the input device 120 (e.g., cell signal strength or other wireless signal strengths), field input characteristics (e.g., numbers vs. words, topic of the field, etc.), future field input characteristics (e.g., do any future fields expect similar answers that may fail the voice recognition), a confidence level in the accuracy of the voice recognition engine 124's conversion of speech to text, pre-existing rules or history, or other similar evaluations. Cognitive rules engine 126 may then select an appropriate intervention based on the evaluation.

In some aspects, after a manual intervention has been invoked and successfully resolved, the remaining fields in the form may be individually analyzed by cognitive rules engine 126 based on the selected speech rule 130 to determine whether they may need to utilize an alternative modality to speech recognition. For example, where the voice recognition failure occurred in a form field that requires the entry of a number, the remainder of the form fields may be analyzed to determine where the entry of other numbers may be required. If any additional fields require a number, cognitive rules engine 126 may tag those fields as automatically requiring manual intervention using the alternate modality, e.g., text message input, while the remaining fields may continue to be filled using voice recognition. This allows voice recognition system 100 to preemptively address fields that are likely to have failures for this user so as to reduce user frustration, wasted time, and wasted resources.

As an example scenario, a user is completing a long form on her phone using a voice recognition engine 124 to dictate the information needed for each of the different fields. She is multi-tasking and trying to complete several things at once, which reduces her cognitive awareness. She has tried to dictate her phone number for the phone number field multiple times, however, the information typed by the voice recognition engine 124 is not matching up with the format required by the form. In response to this failure, cognitive rules engine 126 may be invoked to analyze the failure and implement a number of different manual interventions. For example, cognitive rules engine 126 may utilize one or more speech rules 130 and historical speech data 132 to determine that the user has reduced cognitive awareness. For example, cognitive rules engine 126 may analyze the context of the user, e.g., is the user performing another function on the computing device 110, is there noise in the background indicative of the user performing another function, etc, and may determine that the user has reduced cognitive awareness due to multitasking. Cognitive rules engine 126 may then apply a speech rule 130 for reduced cognitive awareness when inputting numbers, or more particularly, when inputting phone numbers. The speech rule 130 may then be used to select a manual intervention.

For example, in an aspect, cognitive rules engine 126 may perform a data mining operation for the user's phone number from existing data sources, e.g., storage on the user's computing device, the user's social media profile, a digital phone book, or any database that may have the user's phone number and may populate the field with the user's phone number as provided by the existing data sources.

In another aspect, cognitive rules engine 126 may prompt an alternate user for the data, e.g., message the user's friend, coworker, etc., for the user's phone number.

In yet another aspect, cognitive rules engine 126 may prompt the user using an alternative modality for the user's phone number. For example, the cognitive rules engine 126 may transmit a request to the user's smart phone prompting the user to input the data required for the phone number field. In another example, the cognitive rules engine 126 may prompt the user via computing device 110 to input the user's phone number using an input device 120 such as a keyboard or touch sensitive screen. The user may reply to the prompt by entering the user's phone number which is then used to fill in the field.

In some aspects, each of the above manual interventions may be available according to the applied speech rule 130. In some aspects, each of the above manual interventions may have a confidence level 134 that may be compared to determine which manual intervention cognitive rules engine 126 will select. For example, the confidence level 134 may be based on a comparison of the speech data 122 to historical speech data 132. In another aspect, for example, the confidence level 134 may be based on a comparison of the context of past failures and corresponding successful manual interventions. For example, if a data mining operation has been used in the past to successfully find the user's phone number or other numerical entry data when the voice recognition fails due to reduced cognitive awareness, the data mining operation may received a high confidence level and may be selected by cognitive rules engine 126 for use in a manual intervention.

After receiving a valid input from the selected manual intervention, one or more speech rules 130 may be updated or new rules may be added that reflect the voice recognition failure and successful intervention. For example, existing speech rules 130 may be updated or a new speech rule 130 may be added based on the context that when the user has reduced cognitive awareness due to multi-tasking, the user has difficulty filling in number fields using voice recognition. Voice recognition system 100 may then proceed with the remaining fields on the long form using voice recognition. In some aspects, for example, when the user reaches another field that requires a number and is still having reduced cognitive awareness due to multitasking, the voice recognition system may simply implement the intervention that was successful for the user's phone number without first attempting to perform voice recognition for the number.

In another example scenario, another user is calling in a service request for his business that consists of several fields, one of which is a 14 digit shipping identification number. The voice recognition engine 124 is failing to correctly capture the number and performs a partial request, "can you repeat the last 4 digits?" The user repeats the last four digits but the voice recognition engine 124 still fails to capture the numbers. Cognitive rules engine 126 may then analyze the failure using intervention rules catalogue 128 and determines that there is a partial failure in the voice recognition process. A speech rule 130 for this situation may indicate that an available manual intervention is to transmit a request to the user for manual input using an input device 120. For example, the speech rule 130 may cause cognitive rules engine 126 to implement a manual intervention by transmitting an SMS message to the user's phone prompting the user to input the missing 4 digits from the failed voice recognition. The user may then input the 4 missing digits, e.g., via input device 120 or another input device, and send the inputted digits back to cognitive rules engine 126. Cognitive rules engine 126 may then inject the missing digits into the appropriate form field and voice recognition engine 124 may continue prompting the user for the rest of the form via voice input.

In yet another example scenario, the user may be calling in a service request for his business that consists of several fields, one of which is an 11-digit shipping identification number. The voice recognition engine 124 is failing to extract a valid number from the user's spoken input. The cognitive rules engine 126 analyzes the speech data 122 using intervention rules catalogue 128 and determines that the confidences for the speech-to-text results are low. During the analysis, cognitive rules engine 126 also determines that user has performed one or more types of conversational repeat requests (e.g., "what did you say?"; "my container what?"; "number?") in the preceding turns and therefore determines that the user's environment likely has high background noise. The determination that the user's environment likely has a high background noise may be based, for example, on a speech rule 130 that specifies that conversational repeat requests by a user indicate high background noise. Cognitive rules engine 126 then applies one or more manual interventions based on the speech rule 130. For example, knowing that the background noise is high, cognitive rules engine 126 may switch input modes and send an SMS message to the user's computing device, mobile phone, etc. In some aspects, for example, the switching of input modes as a manual intervention may be specified by the speech rule 130 used to determine that there is high background noise. The user may input the 11-digit number and send it to the cognitive rules engine 126, e.g., via a text message. Cognitive rules engine 126 may inject the 11-digit number into the appropriate form field and may switch input modes back to voice recognition for further speech-to-text.

Figure 2:
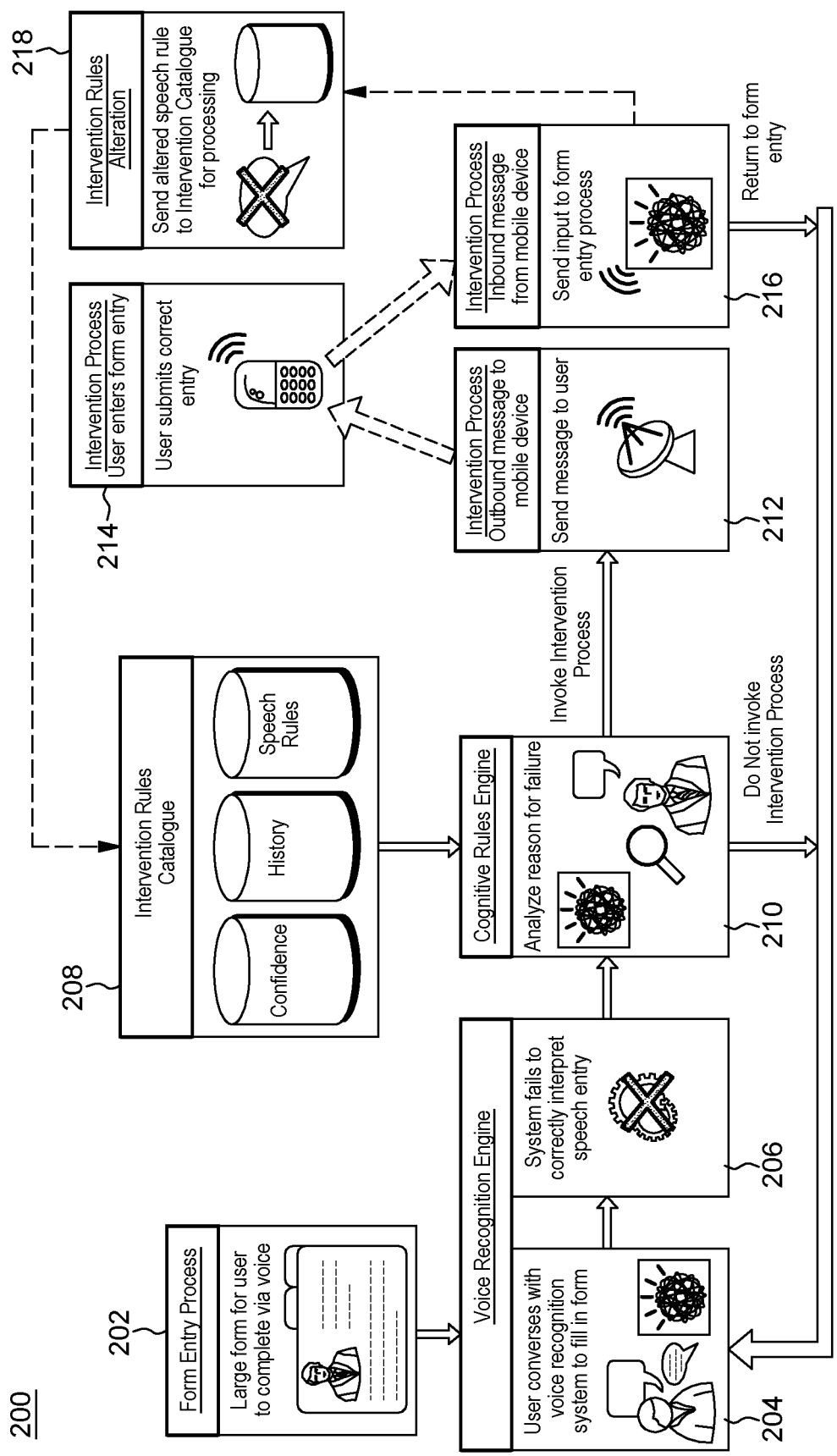
FIG. 2 is a flow chart of a method according to an embodiment of the present disclosure.

With reference now to FIG. 2, a method 200 of dynamic multi-modal re-routing of a failed voice recognition based on projected best channel is illustrated.

At 202, the user selects a form to be filled using voice recognition engine 124. For example, the user may select the form to be filled from a plurality of forms displayed on display 118 using input device 120. In some aspects, voice recognition engine 124 may analyze the selected form for text fields and field content information, e.g., using optical character recognition (OCR). For example, where a field has a header of "phone number," voice recognition engine 124 may analyze the field and determine the appropriate question to ask the user for filling that field. In some aspects, the form may include metadata associated with each field that provides voice recognition engine 124 is the appropriate content, context, or question to ask the user.

At 204, voice recognition engine 124 prompts the user for answers to questions used to fill in the form fields. For example, voice recognition engine 124 may prompt the user visually, audibly, or in any other manner. The user may respond to the prompt by speaking the answer which is then captured by input device 120 as speech data 122. Voice recognition engine 124 then analyzes the speech data 122 to convert the speech data to text.

At 206, voice recognition engine 124 fails to correctly convert some or all of the speech data 122 into meaningful text. For example, voice recognition engine 124 may convert the speech data 122 to text but the text may be unintelligible, e.g., the text may not correspond to any meaningful words. In some aspects, voice recognition engine 124 may attempt to rehabilitate the speech data 122 for the form field by requesting a full repeat or partial repeat of the user's spoken input. In some aspects, voice recognition engine 124 may also perform a hearing check to determine whether the user is able to hear the prompts presented by voice recognition engine 124 and whether there is any background noise that may be affecting the quality of the speech data 122.

At 208, cognitive rules engine 126 may receive intervention rules catalogue 128 including speech rules 130, historical speech data 132 for the user, and confidence levels 134 for the speech rules 130 and historical speech data 132.

At 210, cognitive rules engine 126 may analyze the failure of the voice recognition engine to convert the speech data 122 into intelligible text as described above. For example, cognitive rules engine 126 may determine or select a speech rule 130 that matches the context of the failure as described above, may determine a confidence level 134 of the speech rule 130 for the speech data 122 based on historical speech data 132 and may determine based on the selected speech rule 130 a manual intervention to be invoked. In some aspects, for example, cognitive rules engine 126 may determine whether the user is experiencing reduced cognitive abilities (e.g., is distracted, or otherwise inhibited from speaking normally) based on the user's historical speech data 132.

At 212, cognitive rules engine 126 may invoke the manual intervention process according to the selected speech rule 130. For example, cognitive rules engine 126 may transmit a message to a computing device of the user, e.g., computing device 110, a mobile device, smart phone, smart wearable technology, etc., including a prompt for the user to input information corresponding to the failed speech data using another modality other than spoken input. For example, the modality may be a text message or other application on the smart device, a keyboard input, or any other modality that may be used to enter information.

At 214, the user enters the information into the computing device in response to the prompt and transmits the entered information back to cognitive rules engine 126. For example, the user may type in the missing information using a keyboard, touch screen or other similar input device and send a text message containing the information to cognitive rules engine 126.

At 216, the information is received by cognitive rules engine 126 and cognitive rules engine 126 injects the information into the form field that failed thereby filling the form field. The method may then return to 204 and voice recognition engine 126 may continue prompting the user for voice input to fill in the remaining fields of the form.

In some aspects, at 218, cognitive rules engine 126 may also optionally transmit the speech data 122, analysis, and result of the manual authentication to intervention rules catalogue 128 to update the speech rules 130.

Figure 3:
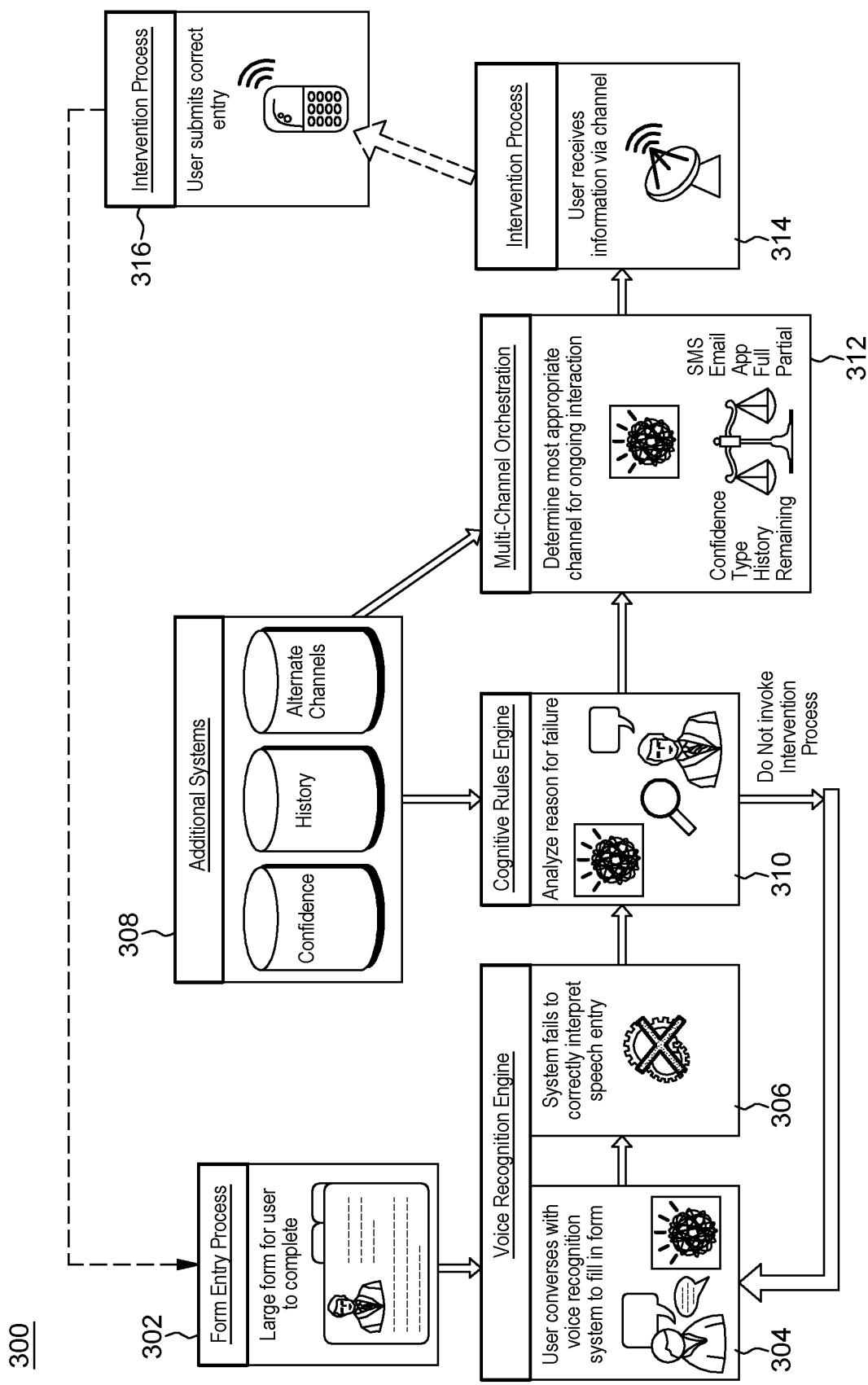
FIG. 3 is a flow chart of a method according to another embodiment of the present disclosure.

With reference now to FIG. 3, a method 300 of dynamic multi-modal re-routing of a failed voice recognition based on projected best channel is illustrated.

At 203, the user selects a form to be filled using voice recognition engine 124. For example, the user may select the form to be filled from a plurality of forms displayed on display 118 using input device 120. In some aspects, voice recognition engine 124 may analyze the selected form for text fields and field content information, e.g., using optical character recognition (OCR). For example, where a field has a header of "phone number," voice recognition engine 124 may analyze the field and determine the appropriate question to ask the user for filling that field. In some aspects, the form may include metadata associated with each field that provides voice recognition engine 124 is the appropriate content, context, or question to ask the user.

At 304, voice recognition engine 124 prompts the user for answers to questions used to fill in the form fields. For example, voice recognition engine 124 may prompt the user visually, audibly, or in any other manner. The user may respond to the prompt by speaking the answer which is then captured by input device 120 as speech data 122. Voice recognition engine 124 then analyzes the speech data 122 to convert the speech data to text.

At 306, voice recognition engine 124 fails to correctly convert some or all of the speech data 122 into meaningful text. For example, voice recognition engine 124 may convert the speech data 122 to text but the text may be unintelligible, e.g., the text may not correspond to any meaningful words. In some aspects, voice recognition engine 124 may attempt to rehabilitate the speech data 122 for the form field by requesting a full repeat or partial repeat of the user's spoken input. In some aspects, voice recognition engine 124 may also perform a hearing check to determine whether the user is able to hear the prompts presented by voice recognition engine 124 and whether there is any background noise that may be affecting the quality of the speech data 122.

At 308, cognitive rules engine 126 may receive additional systems including, for example, alternate channels, historical data for the user, and confidence levels for the various form fields based on the historical data for the user. The alternate channels may includes, for example, SMS, e-mail, application interfaces, full repeats, partial repeats, or any other channel that may be used to receive input from the user. The historical data may include prior failures of the voice recognition including context such as the type of form field, type of failure, any alternate channels used to remedy the failure, the success rate of the alternate channels for each failure, and other similar historical data for the user.

At 310, cognitive rules engine 126 may analyze the failure of the voice recognition engine to convert the speech data 122 into intelligible text as described above. For example, cognitive rules engine 126 may determine the context of the failure as described above.

At 312, cognitive rules engine 126 may determine an appropriate manual intervention to be invoked based on the context of the failure, the available alternate channels, the form field of the failure, the user history data, and the confidence level of each available alternate channel determined from the user history data for that type of form field. In some aspects, for example, cognitive rules engine 126 may determine whether the user is experiencing reduced cognitive abilities (e.g., is distracted, or otherwise inhibited from speaking normally) based on a comparison to the user's historical speech data 132 and may determine the appropriate alternate channel that historically has the highest success rate for the user when the user is experiencing reduced cognitive abilities.

At 314, cognitive rules engine 126 may invoke the manual intervention process according to the selected alternate channel. For example, cognitive rules engine 126 may transmit a message to a computing device of the user, e.g., computing device 110, a mobile device, smart phone, smart wearable technology, etc., including a prompt for the user to input information corresponding to the failed speech data using another modality other than spoken input. For example, the modality may be a text message or other application on the smart device, a keyboard input, or any other modality that may be used to enter information.

At 316, the user enters the information into the computing device in response to the prompt and transmits the entered information back to cognitive rules engine 126 and cognitive rules engine 126 injects the information into the form field that failed thereby filling the form field. For example, the user may type in the missing information using a keyboard, touch screen or other similar input device and send a text message containing the information to cognitive rules engine 126. The method may then return to 302 and voice recognition engine 126 may continue prompting the user for voice input to fill in the remaining fields of the form at 304.

Figure 4:
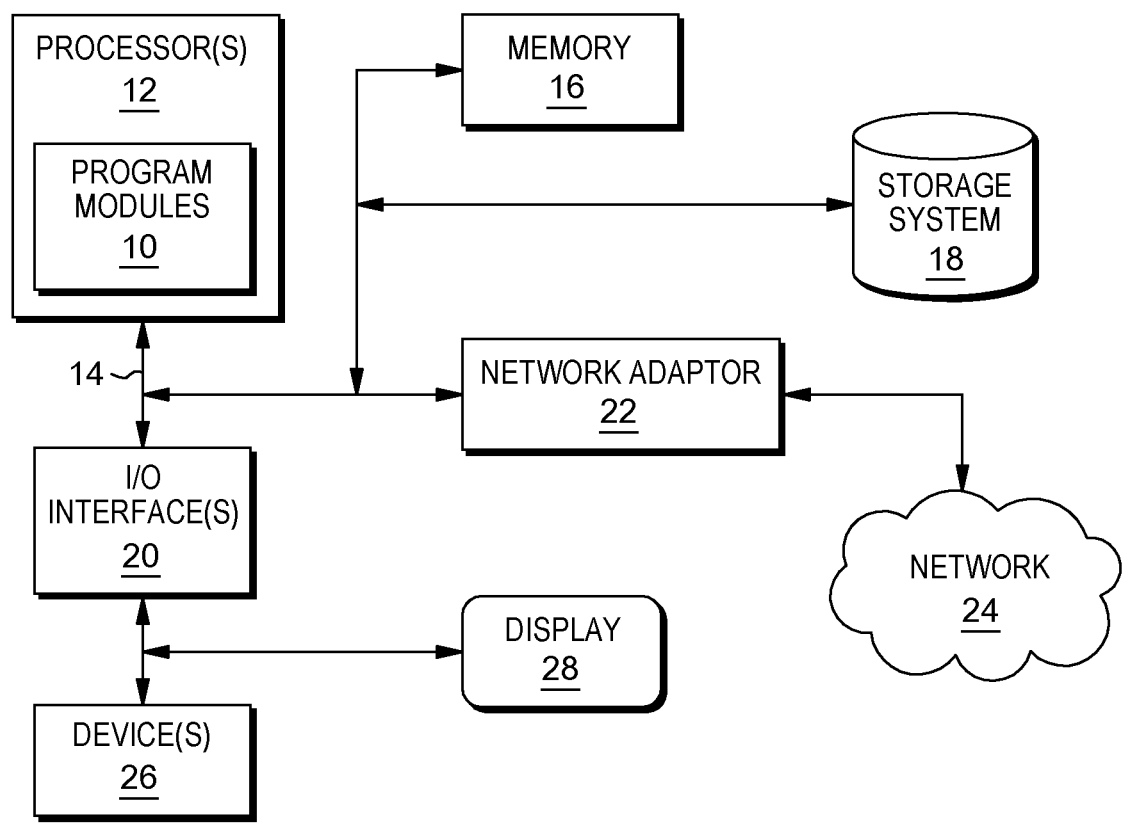
FIG. 4 is an exemplary block diagram of a computer system in which processes involved in the system, method, and computer program product described herein may be implemented.

FIG. 4 illustrates a schematic of an example computer or processing system that may implement any portion of system 100, audio sensing device 110, visual sensing device 120, motion sensing device 130, computing device 140, analysis engine 160, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
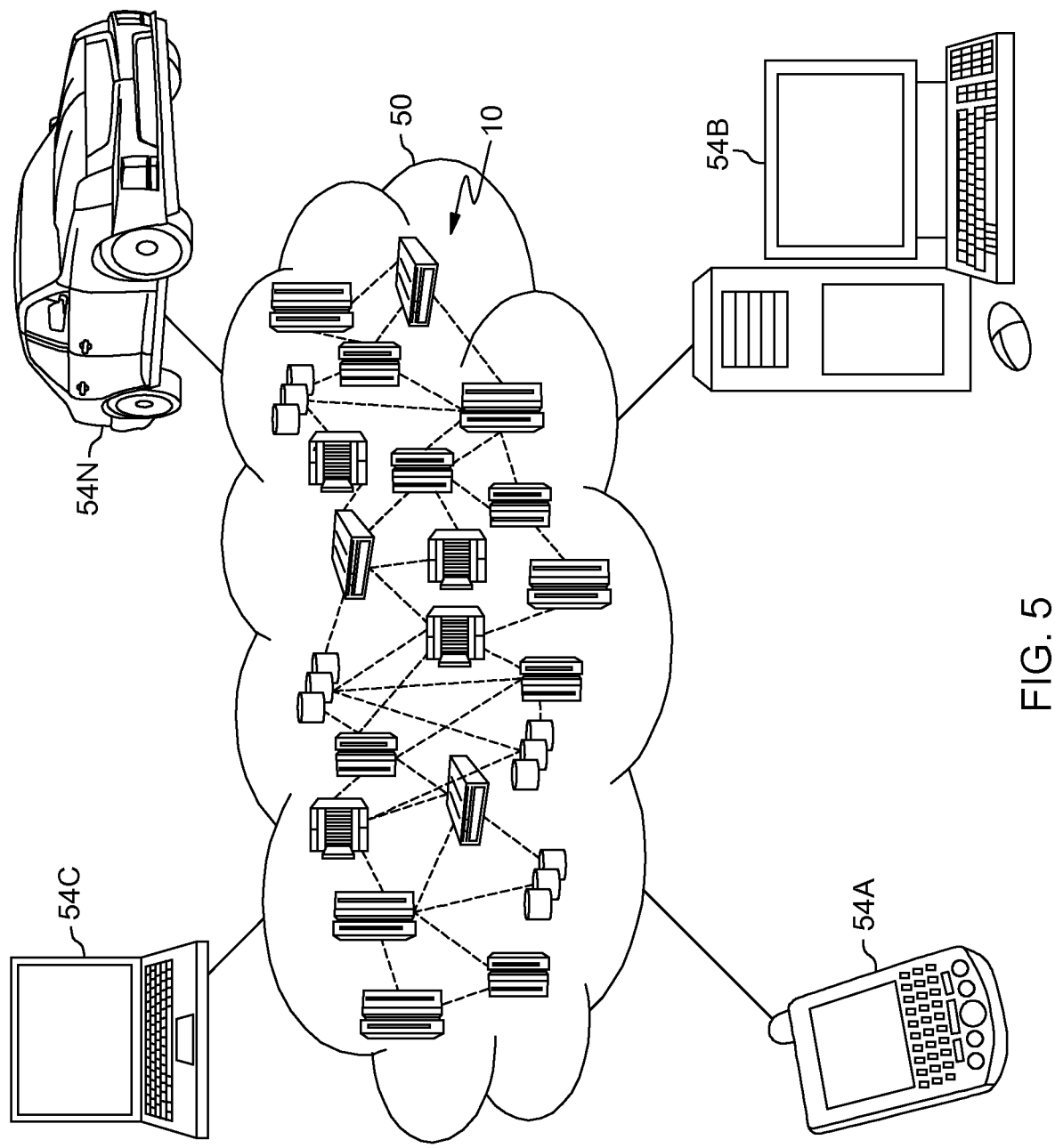
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
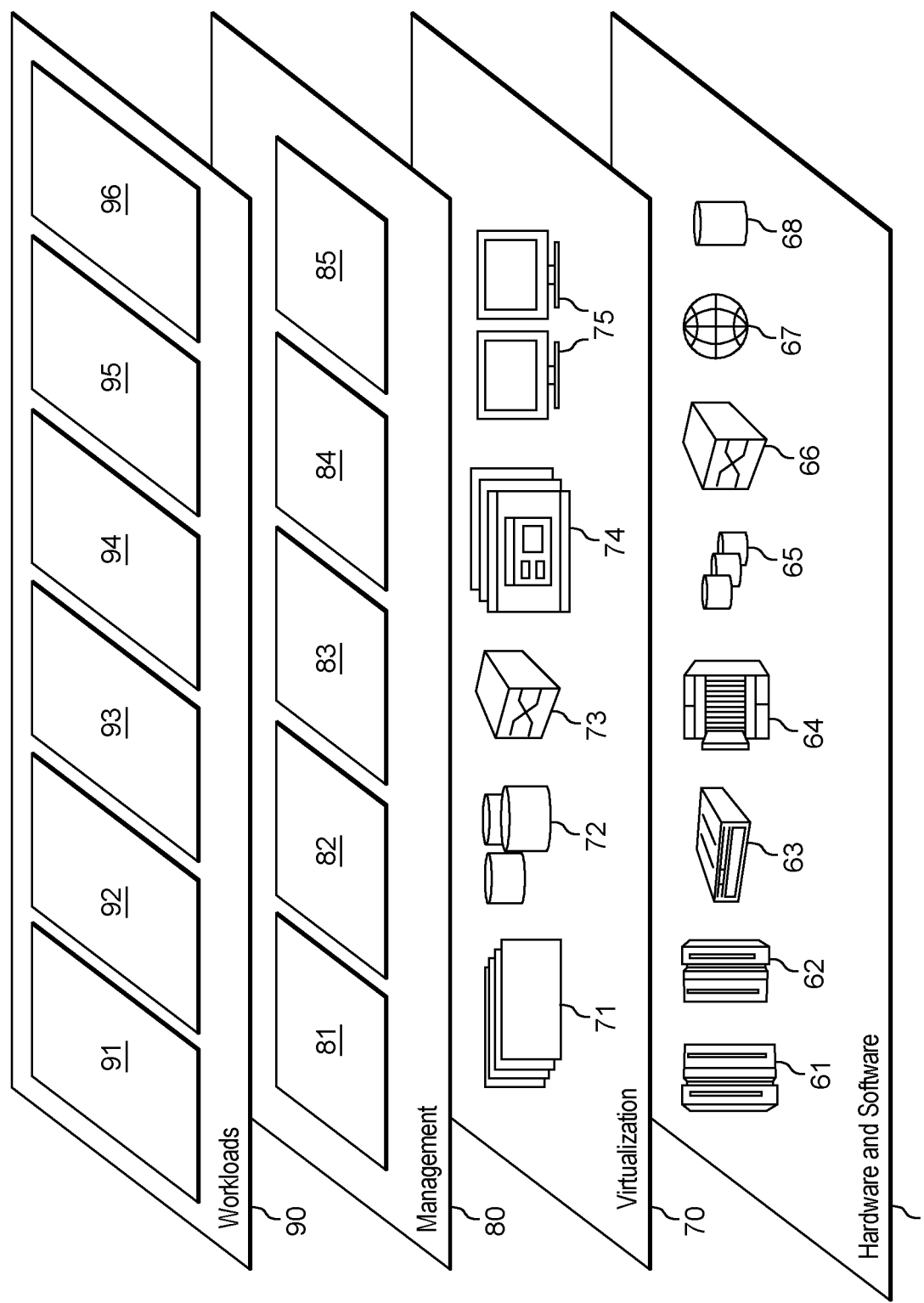
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice recognition processing 96 as describe above with respect to voice recognition system 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor for multi-modal re-routing of a failed voice recognition based on projected best channel, the method comprising:
   prompting a user for information corresponding to a field of a form;
   generating speech data by at least one input device, the speech data generated by capturing a spoken response of the user to the prompt;
   attempting to convert the speech data to text;
   determining that the attempted conversion has failed, and identifying the speech data as failed;
   determining a reason for the failed speech data;
   identifying, based on the determined reason for the failed speech data, an alternate channel as a projected best channel for receiving the information corresponding to the field of the form;
   transmitting a message to the user prompting the user to input information corresponding to the failed speech data using the identified alternate channel;
   receiving from the user the information corresponding to the field of the form from the identified alternate channel; and
   injecting the received information into the field of the form; and
   wherein the identifying an alternate channel as a projected best channel includes using a cognitive rules search engine to evaluate the failed speech data, based on a multitude of available alternate channels, the field of the form, user history data, and a confidence level of each of the available alternate channels, to identify one of the available alternate channels as the projected best channel for receiving the information corresponding to the field of the form.

2. The method of claim 1, wherein the determining a reason for the speech data as failed includes determining a context of the failed speech data.

3. The method of claim 2, wherein the identifying an alternate channel includes identifying the alternate channel based on the determined context of the failed speech data.

4. The method according to claim 3, wherein the context of the failed speech data is a reduced cognitive ability of the user.

5. The method according to claim 4, wherein the determining a context of the failed speech data includes determining the reduced cognitive ability of the user based on a comparison to historical speech data of the user.

6. The method according to claim 1, wherein the identifying an alternate channel for receiving the information corresponding to the field of the form includes identifying one of the multitude of alternate channels based on which one of the multitude of alternate channels has the highest success rate for the user when the user is experiencing reduced cognitive abilities.

7. The method according to claim 1, further comprising after receiving the information corresponding to the field of the form, continuing prompting the user for voice input to fill remaining fields of the form.

8. A system for providing an alternate modality of input for filling a form field in response to a failure of voice recognition comprising:
   at least one input device configured to generate speech data by capturing a spoken response of a user; and
   at least one hardware processor configured to:
     prompt a user for information corresponding to a field of a form;
     generate speech data by at least one input device, the speech data generated by capturing a spoken response of the user to the prompt;
     attempt to convert the speech data to text;
     determine that the attempted conversion has failed, and identifying the speech data as failed;
     determine a reason for the failed speech data;
     identify, based on the determined reason for the failed speech data, an alternate channel for receiving the information corresponding to the field of the form;
     transmit a message to the user prompting the user to input information corresponding to the failed speech data using the identified alternate channel;
     receive from the user the information corresponding to the field of the form from the identified alternate channel; and
     inject the received information into the field of the form; and
     wherein identifying an alternate channel as a projected best channel includes using a cognitive rules search engine to evaluate the failed speech data, based on a multitude of available alternate channels, the field of the form, user history data, and a confidence level of each of the available alternate channels, to identify one of the available alternate channels as the projected best channel for receiving the information corresponding to the field of the form.

9. The system of claim 8, wherein determining a reason for the failed speech data includes determining a context of the failed speech data.

10. The system of claim 9, wherein identifying an alternate channel includes identifying the alternate channel based on the determined context of the failed speech data.

11. The system according to claim 10, wherein the context of the failed speech data is a reduced cognitive ability of the user.

12. The system according to claim 11, wherein the determining a context of the failed speech data includes determining the reduced cognitive ability of the user based on a comparison to historical speech data of the user.

13. The system according to claim 8, wherein identifying an alternate channel for receiving the information corresponding to the field of the form includes identifying one of the multitude of alternate channels based on which one of the multitude of alternate channels has the highest success rate for the user when the user is experiencing reduced cognitive abilities.

14. The system according to claim 8, wherein the at least one hardware processor is further configured to:

after receiving the information corresponding to the field of the form, continue to prompt the user for voice input to fill remaining fields of the form.

15. A non-transitory computer readable medium comprising instructions for multi-modal re-routing of a failed voice recognition based on projected best channel that, when executed by at least one processor, configures the at least one processor to:
prompt a user for information corresponding to a field of a form;
generate speech data by at least one input device, the speech data generated by capturing a spoken response of the user to the prompt;
attempt to convert the speech data to text;
determine that the attempted conversion has failed, and identifying the speech data as failed;
determine a reason for the failed speech data;
identify, based on the determined reason for the failed speech data, an alternate channel as a projected best channel for receiving the information corresponding to the field of the form;
transmit a message to the user prompting the user to input information corresponding to the failed speech data using the identified alternate channel;
receive from the user the information corresponding to the field of the form from the identified alternate channel; and
inject the received information into the field of the form; and
wherein identifying an alternate channel as a projected best channel includes using a cognitive rules search engine to evaluate the failed speech data, based on a multitude of available alternate channels, the field of the form, user history data, and a confidence level of each of the available alternate channels, to identify one of the available alternate channels as the projected best channel for receiving the information corresponding to the field of the form.

16. The non-transitory computer readable medium of claim 15, wherein determining a reason for the failed speech data includes determining a context of the failed speech data.

17. The non-transitory computer readable medium of claim 16, wherein identifying an alternate channel includes identifying the alternate channel based on the determined context of the failed speech data.

18. The non-transitory computer readable medium according to claim 17, wherein the context of the failed speech data is a reduced cognitive ability of the user.

19. The non-transitory computer readable medium according to claim 18, wherein the determining a context of the failed speech data includes determining the reduced cognitive ability of the user based on a comparison to historical speech data of the user.

* * * * *